L. J. PHELPS.
IRREVERSIBLE STEERING GEAR ATTACHMENT FOR MOTOR CARS.
APPLICATION FILED DEC. 6, 1915.
1,187,860.
Patented June 20, 1916.
2 SHEETS—SHEET 2.
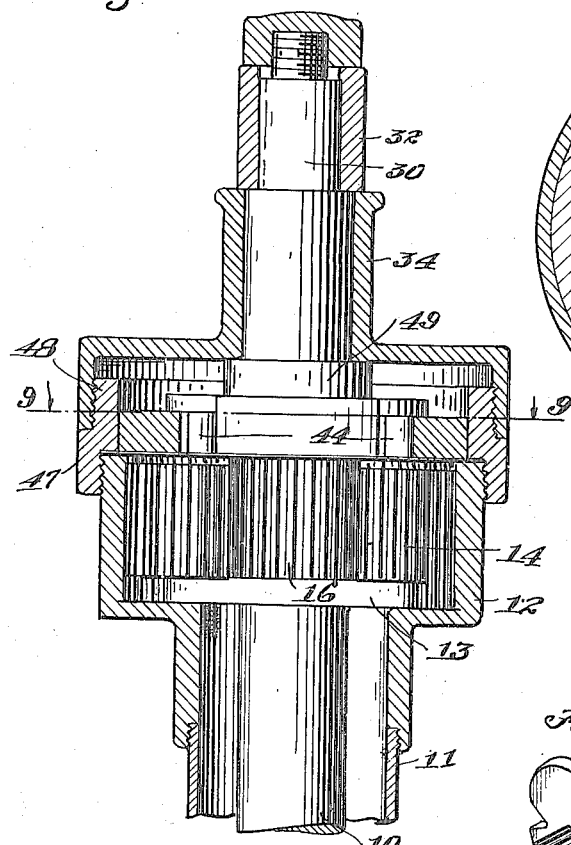
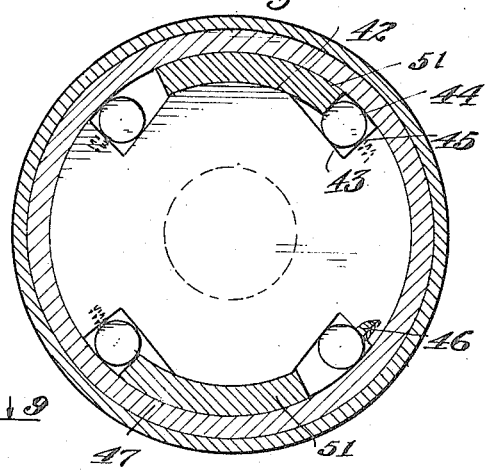
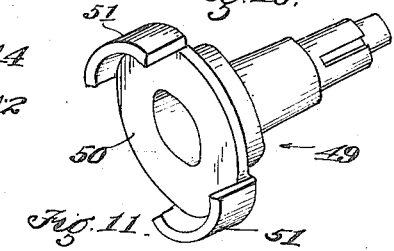
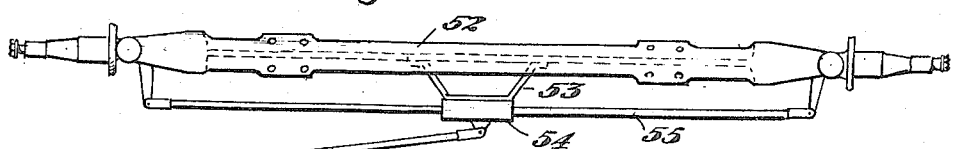
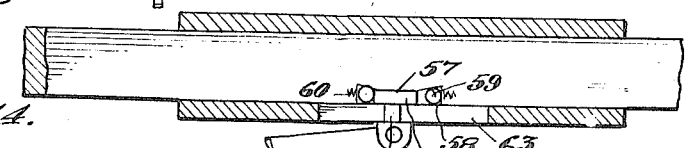
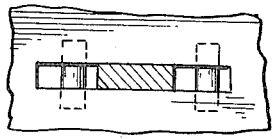
Inventor,
Lucius J. Phelps,
by Hazard Berry & Miller
Attys.

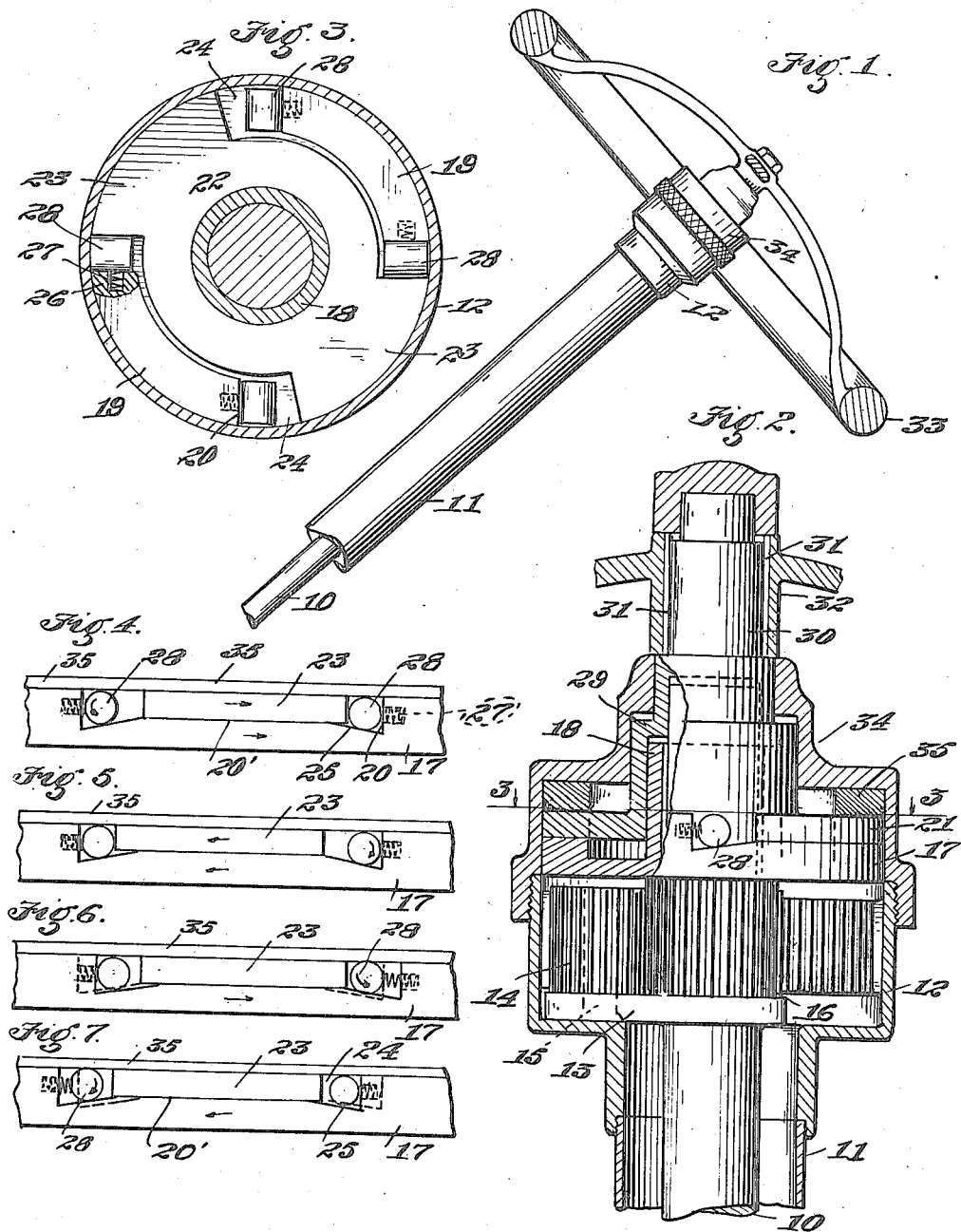

UNITED STATES PATENT OFFICE.

LUCIUS J. PHELPS, OF SAN DIEGO, CALIFORNIA.

IRREVERSIBLE STEERING-GEAR ATTACHMENT FOR MOTOR-CARS.

1,187,860.   Specification of Letters Patent.   Patented June 20, 1916.

Application filed December 6, 1915. Serial No. 65,392.

*To all whom it may concern:*

Be it known that I, LUCIUS J. PHELPS, a citizen of the United States, residing at San Diego, in the county of San Diego and State of California, have invented new and useful Improvements in Irreversible Steering-Gear Attachments for Motor-Cars, of which the following is a specification.

My invention relates to an irreversible steering gear attachment for motor cars, and consists in a modification of the well-known roller clutch in which I make the clutch double-acting, preventing its movement in either direction, and providing means for releasing the clutch and moving it in either direction at the will of the operator.

As is well-known, the steering gear of most motor vehicles requires that the operator keep his hands constantly on the steering wheel in order to control the same. A motor car, if left to itself without this constant control, would quickly leave the road. This tendency of the car to leave the road is due to the fact that the front wheels of the car, as they strike an obstruction or obstacle, will communicate motion to the tie rod of the steering gear, which, in turn, will communicate this motion to the steering post. The result is that there is constant oscillatory vibration of the steering wheel and a tendency to turn the latter in one direction or the other. This tendency is aggravated when, on account of wear, there is lost motion or back lash in the steering gear. For the reasons just stated, it is necessary for the operator of the car to keep his hand constantly on the wheel, so that the same may be under his instant control to prevent accidents from the car leaving the road.

It is an object of this invention to construct a device which may be easily applied to the cars now commonly in use and which will positively prevent any reverse action of the steering gear due to the obstacles encountered by the front wheels, as above explained, from being communicated to the steering wheel.

It is another object of this invention to prevent any such accidental rotation of the steering post and to lock the steering gear in position, yet at the same time allowing absolutely free operation of the steering wheel by the operator, which operation will instantly unlock the device, allowing the rotation of the steering post to change the direction of the car as desired.

While I have shown my device as applicable to the steering gear of a motor vehicle, I do not wish to be limited thereto, as my invention is capable of wider application. It may be used in connection with steering gears on boats, or ships, also in connection with rotating shafts where it is desired to employ a clutch which will prevent any accidental turning of the driven shaft in either direction, yet which allows the driving gear or driving shaft to rotate the driven shaft in either direction as desired.

With these and other objects in view which will appear as the description proceeds, my invention consists in the construction and arrangement of parts hereinafter described and claimed.

In the accompanying drawings which form a part of this specification, I have illustrated a convenient and practical embodiment of my invention, and in which:

Figure 1 is a side elevation of a steering post of an automobile to which my irreversible steering gear is applied. Fig. 2 is a longitudinal cross-sectional view of my device showing its attachment to the steering post. Fig. 3 is a cross-section of a plane taken on line 3—3 of Fig. 2. Figs. 4, 5, 6 and 7 are detail views on an enlarged scale, hereinafter to be referred to. Fig. 8 is a front elevation partly in section of a modification of my device. Fig. 9 is a horizontal section thereof taken on a plane indicated by the line 9—9 of Fig. 8. Fig. 10 is a perspective view of the clutch operating member. Fig. 11 is a perspective view of the lower clutch member. Fig. 12 is a plan view of another modification of my steering gear attachment applied to the tie rod of the steering knuckles. Fig. 13 is a detail view on an enlarged scale of the clutch of the modification shown in Fig. 12. Fig. 14 is a detail view hereinafter to be referred to.

In the drawings I have shown my device in connection with the well-known steering gear assembly of the Ford car, although it will be obvious that the invention is not limited thereto and may be used in connection with any other steering gear.

10 represents the steering post within a tubular steering post casing 11. At the upper end of said casing, the "sun and planet" gears of the steering post are attached. The same consists of the internal gear casing 12, which is rigidly mounted at the upper end of the steering post casing. A triangular gear supporting plate 13 is rigidly mounted to the upper end of the steering post. Plate 13 supports three steering gear pinions 14 at its apices which are rotatably mounted on pins 15. The steering gear pinions are in mesh with the internal gear of the gear casing 12. A steering gear drive pinion 16, rigidly secured to a lower clutch member 17, is positioned in the center of the three steering gear pinions 14 and is in operative engagement therewith. The lower clutch member 17 is positioned at the upper end of the steering gear casing 12 and has the shape of a circular disk from which a central cylindrical boss 18 projects upwardly. The upper face of the lower clutch member 17 is provided with a pair of arc-shaped flanges 19—19 which are disposed along its periphery at diametrically opposite sides. These flanges 19—19 form vertical shoulders 20 at their extremities with the main portion of the lower clutch member. A rotatable clutch operating member 21 consisting of horizontal ring-shaped portion 22, from which a pair of segmental wings 23 horizontally extend, is slidably mounted on the lower clutch member 17, so that the wings 23—23 will engage the portions of the lower clutch member which are situated between each pair of two adjacent shoulders 20—20 of the flanges 19—19. As clearly shown in Figs. 3 to 7, the wings 23—23 are smaller in length than the recesses 20' between the shoulders 20—20 and form sockets or recesses 24 between each shoulder 20 and the adjacent wing 23. The bottom face 25 of the sockets 24 is cut on an incline, so that the lower point will be adjacent the shoulder 20, as clearly shown in Figs. 4 to 7. Each shoulder 20 is provided with a horizontal cylindrical socket 26, in which a small coiled spring 27 is disposed whose outer end abuts against the cylindrical roller 28. The diameter of the roller is such that when the same engages the shoulder 20 the top thereof will be slightly below the upper faces of the flanges 19 and the wings 23. As the roller 28 is moved toward the higher end of the bottom face 25, it will gradually extend slightly above the horizontal plane of the upper faces of the flanges 19 and the wings 23. The upper faces of the wings 23 and the flanges 19 are in the same plane. Extending upwardly from the ring-portion 22, of the upper clutch operating member 21, is a hollow cylindrical housing 29, which incloses in sliding engagement the boss 18 of the lower clutch member. The upper extremity of said housing forms a short cylindrical shaft 30 which, by means of a pair of keys 31—31 is operatively connected to the sleeve 32 of the steering wheel 33. A centrally apertured cylindrical cap 34 surrounds the lower clutch members 17 and the operating member 21 and is screw-threaded on the gear casing 12. A metal ring 35, preferably of steel, is rigidly mounted to the bottom of the cap 34. This ring constitutes the upper clutch member and is of a width corresponding to that of the flanges 19 of the lower clutch member. The cap 34 is screwed down upon the gear casing 12 until the ring 35 engages the upper faces of the flanges 19 and the wings 23, but allows free rotation of the said flanges and wings.

Referring now to the modification of the steering gear attachment shown in Figs. 8 to 11, the same is similar in all respects to the construction shown in Figs. 1 to 7, except that the movable clutch member, the clutch operating member and the stationary clutch member are of slightly different shape and arrangement, and the clutch rollers are vertically disposed. The movable clutch member 40 comprises a circular disk 41, which has a portion of its periphery cut away on diametrically opposite sides to form arc-shaped recesses 42. These recesses are constructed at their ends with sides sloping inwardly, as at 45, so that the maximum width of the recesses will be at the ends thereof. Vertical rollers 44 are disposed at the ends of the recesses 42. Helical springs 45, disposed in sockets 46 in the movable clutch members, engage said rollers and tend to move them away from the ends of the recesses toward the middle thereof. A flanged cap 47 is provided with a tubular ring 48 on the inner side of the flange, said ring 48 constituting the stationary clutch member. The clutch operating member 49 comprises a lower circular face 50, which engages the central upper face of the movable clutch member 40. A pair of arc-shaped depending lugs 51 project from the periphery at diametrically opposite sides into the recesses 42. The length and width of said lugs is such as to fit snugly in the central portion of the recesses 42 between the stationary ring-shaped clutch member 48 and the movable clutch member 40, leaving a substantial clearing space between the lateral ends of the lugs and the adjacent rollers 43, as clearly shown in Fig. 9.

Referring to the construction shown in Figs. 12, 13 and 14, 52 represents the front axle of the automobile to which a bracket 53 is secured. A horizontal tubular sleeve 54, constituting the stationary clutch member, is secured on said bracket in which the tie rod 55 is slidably mounted. 56 is a tie rod operating link which is operatively connected to the steering gear (not shown) of an automobile. The tie rod is cut away on its periphery to form an arc-shaped recess 57 with the bottom faces sloping away from the periphery, as at 58. The rollers 59—59 are located at the ends of said recess and are engaged by springs 60—60 mounted in the tie rod, said springs tending to move said rollers toward the middle of said recess. The arc-shaped clutch operating member 61, located in said recess between said rollers, is pivotally connected by a short arm 62 with the link 56. The sleeve 54 is provided with a narrow slot 63 in which the arm 62 may be horizontally reciprocated, as shown in Fig. 14. The width of the slot 63 is considerably smaller than the width of the recess 57.

Operation: Referring to the construction shown in Figs. 1 to 7: assuming that the steering wheel is rotated so that the wing 23 of the clutch operating member is moved in a direction indicated by the arrow shown in Fig. 4. The right hand lateral end of said wing will push the steel roller 28 against the shoulder 20 of the adjacent flange of the lower clutch member. The roller being now in the deepest portion of the recess 24 will have its top slightly below the lower face of the ring-shaped upper clutch member 35. Motion will now be communicated from the wing 23 through the steel roller 28 to the lower clutch member 17. The steel roller 28 at the left hand side of the wing 23 will roll down from the upper portion of the recess 24 to the deeper portion thereof against the tension of the coiled spring 26. This action is due to the frictional engagement between the stationary clutch member 35 and the steel roller, the latter turning in the direction indicated by the arrow. The reverse action takes place when the wing 23 is moved in the opposite direction, as indicated by the arrow in Fig. 5. In this case, the steel roller 28 to the left of the wing will be pushed against the tension of the spring 26 into the deeper portion of the recess 24 and will have its top slightly below the stationary clutch member 35. The steel roller 28 to the right of the wing will roll down the inclined bottom of the socket 25 against the tension of the spring 26, the steel roller rotating in the direction shown by the arrow. It will therefore be understood that when the steering wheel and the wings 23—23 connected therewith are rotated in either direction, all the steel rollers will occupy the deeper portions of the sockets in which they are located, causing the tops of said rollers to occupy a plane which either coincides with or is slightly below the plane of the lower face of the stationary clutch member 35. It is therefore evident that said rollers do not interfere in the least with the rotation of the steering post and allow perfectly free movement of the lower clutch member and the clutch operating member. If, on the other hand, a force is applied to the steering post tending to rotate the same in either direction, due to obstructions in the road, as explained, the action illustrated in Figs. 6 and 7 will take place. Assuming that the tendency is to rotate the steering post and the lower clutch member, which is in operative engagement with the gear pinions, in a direction indicated by the arrow in Fig. 6, the shoulder 20 of the lower clutch member will move from the position indicated by the dotted lines to the position indicated by the full lines. The roller 28 on the left hand side will be pushed against the tension of the spring 26 against the shoulder 20 and the vertical side of the adjacent wing 23. This roller will therefore occupy the lowest part of the socket 25 and will therefore not interfere with the rotation of the lower clutch member and the clutch operating member. A different action, however, takes place in regard to the roller at the right hand side of the wing 23. The movement of the lower clutch member toward the right, as indicated, will cause the steel roller to rotate in a direction indicated by the arrow, which will cause the said roller to travel up the inclined bottom 25 of the recess. Since the depth of the higher portions of the socket is less than the diameter of the roller, the latter will become wedged between the stationary clutch member 35 and the face 25 of the lower clutch member. A similar action will occur with the steel roller on the side diametrically opposed to the steel roller that is shown to the right of the wing 23 in Fig. 6. In Fig. 7, a similar action is illustrated when a force is applied to the steering post to rotate the lower clutch member, in a direction opposite to that shown in Fig. 6. In this case, it is the steel roller to the left of the wing 23 which will be caused to roll up the inclined bottom 25 and become wedged between the stationary clutch member 35 at the bottom of the said recess. It will therefore be understood that whether the force applied to the steering post tends to rotate the latter in one direction or the other, there will be one pair of rollers diametrically disposed on the periphery of the lower clutch member, which will become tightly wedged between the stationary clutch member 35 of the cap 34 and the lower clutch member, positively preventing the rotation of the steering wheel in either direction. But if the steering wheel is rotated by the operator in either direction, it will instantly unlock and move the rollers from their locking position, indicated in Figs. 6 and 7, and the action as shown in Figs. 4 and 5 will take place. Theoretically, there will be an extremely slight movement communicated to the steering wheel when the action, shown in Figs. 6 and 7 takes place, that is to say, until the locking rollers are moved to their locking position. This theoretical movement is inappreciable and negligible and may be reduced to any desired minimum by screwing down the cap 34, which will cause the stationary ring 35 to be brought into closer proximity to the rollers. Any lost motion between the upper faces of the wings 23 and the flanges 19 of the clutch operating member and the lower clutch member, respectively, and the stationary clutch member, may be taken up by screwing the cap down upon the outer gear casing 12.

Referring now to the operation of the device illustrated in Figs. 8 to 11: the same is identical with the operation of the device shown in Figs. 1 to 7. It should be noted, however, that in this modification the stationary ring-shaped clutch member 48 is not capable of adjustment in relation to the movable clutch member and the clutch operating member. The principle of the clutch members as described in connection with the "sun and planet" gears of the steering post, is also applicable to the steering gear at any other suitable point. In Figs. 12 to 14, the double roller clutch is applied to the tie rod of the steering knuckles. The movable clutch member 61 may reciprocate the tie rod in either direction but any force applied to the tie rod from the wheels tending to move the latter in either direction will lock the clutch member in fixed position, as will be understood.

It will therefore be seen that I have devised an extremely simple but efficient device for locking the steering gear of an automobile against movement by any force applied to it from the front wheels. At the same time, the operation of the steering gear by the driver is not in the least interfered with. The steering gear responds instantly to the action of the driving in unlocking the locking clutch members.

While I have shown the preferred form of the device as now known to me, it will be obvious that various changes in the construction and arrangement of the parts can be made by those skilled in the art without departing from the spirit of my invention, as covered by the appended claims.

I claim:

1. In an irreversible steering gear attachment for vehicles, the combination of a shaft, a stationary clutch member, a movable shaft-operating clutch member, said movable member having portions adjacent to said stationary member cut away whereby a plurality of wedge-shaped recesses are formed between said members, said recesses being deeper at their ends, rollers mounted in the ends of said recesses adapted to lock said movable member in fixed position, and operating members positioned in said cut-away portions between said rollers for moving said rollers out of locking position and for moving said movable clutch member in either direction.

2. In an irreversible steering gear attachment for vehicles, the combination of a shaft, a stationary clutch member, a movable shaft-operating clutch member, said movable clutch member forming with said stationary clutch member a plurality of wedge-shaped recesses, rollers placed therein adapted to lock the movable member in a fixed position, means under the control of the operator for unlocking said rollers and moving the movable member in either direction, and means for adjusting said stationary and said movable clutch members with relation to each other to control the lost motion in the engagement of said rollers therewith.

3. In an irreversible steering gear attachment for vehicles, the combination of a shaft, a stationary clutch member, a movable shaft-operating clutch member, said movable member forming with said stationary member a pair of opposed wedge-shaped recesses, clutch rollers in said recesses adapted to lock the said movable member to said stationary member in fixed position, means under the control of the operator for moving said clutch rollers out of locking position and for moving said movable member in either direction, and means for adjusting said stationary and said movable clutch members with relation to each other to control the lost motion in the engagement of said rollers therewith.

4. In an irreversible gear attachment for vehicles, the combination of a casing, a shaft within said casing, a stationary clutch member, a movable shaft-operating clutch member adjacent said stationary member, said movable member forming with said stationary member a pair of opposed wedge-shaped recesses, clutch rollers in said recesses adapted to engage said stationary and movable clutch members to lock said movable member to said stationary member in fixed position, means under control of the operator for moving said clutch rollers out of locking position and for moving said movable clutch member and said shaft in either direction, and a cap screwing on said casing against said stationary clutch member.

5. In an irreversible gear attachment for vehicles, the combination of a shaft, a stationary clutch member, a movable shaft-operating clutch member, said movable clutch member having a cut-away portion forming at its ends in conjunction with said stationary clutch member, a pair of opposed wedge-shaped recesses, said recesses being deeper at their ends, rollers mounted in said recesses adapted to engage said stationary and said movable clutch members to lock said movable member in fixed position, a rotatable clutch-operating member positioned in said cut-away portion between said rollers for engaging and moving said rollers out of locking position and for rotating said movable clutch member and said shaft in either direction.

6. In an irreversible steering gear attachment for vehicles, the combination of a shaft, a stationary clutch member, a movable shaft-operating clutch member, said movable member forming with said stationary member a pair of opposed wedge-shaped recesses, said recesses being deeper at their ends, clutch rollers in said recesses adapted to lock said movable member to said stationary member in fixed position, the end walls of said recesses being provided with sockets, springs in said sockets adapted to press against said rollers, and means under the control of the operator for engaging and unlocking said rollers and for rotating said movable member and said shaft in either direction.

7. In an irreversible steering attachment for vehicles, the combination of a fixed housing, a driven shaft entering said housing, a driving shaft mounted wholly within said housing, reducing gears mounted on each shaft and engaging each other in such a manner as to rotate the driven shaft at a less rate of speed than the driving shaft, a clutch attached to the driving shaft adapted to lock said shaft in any given position, and means under the control of the operator for unlocking the said clutch and rotating it together with its shaft and gear in either direction.

8. In an irreversible steering gear attachment for vehicles, the combination of a fixed housing, a driven shaft entering said housing and terminating therein, a driving shaft mounted wholly within said housing, reducing gears mounted on each shaft engaging each other in such a manner as to rotate the driven shaft at a less rate of speed than the driving shaft, a cylindrical shaft operating clutch member rigidly attached to the driving shaft, having its periphery adjacent to the inner wall in the fixed housing, said clutch member forming with the inner wall of said housing a pair of opposed wedge-shaped recesses, clutch rollers mounted in said recesses adapted to engage said cylindrical clutch member, locking it against the inner wall of said housing in any given position and means under the control of the operator for moving said clutch rollers out of locking position and rotating the clutch member in either direction.

9. In an irreversible steering gear for vehicles, the combination of a fixed cylindrical housing, an internal gear cut in the lower part of said housing, a driven shaft entering said housing at its lower end, concentric thereto, two or more arms extending from the upper end of said shaft at right angles thereto within said housing, two or more pinion gears mounted on said arms engaging the said internal gear, a single driving pinion gear mounted concentric with said housing engaging the said pinion gears, a clutch mounted in the upper part of said housing rigidly attached to said driving gear adapted to lock the driving gear in any given position and means under the control of the operator for unlocking said clutch and rotating the said driving gear in either direction.

In testimony whereof I have signed my name to this specification.

LUCIUS J. PHELPS.